United States Patent
Kulkarni

(10) Patent No.: US 10,230,660 B2
(45) Date of Patent: Mar. 12, 2019

(54) METHOD AND SYSTEM FOR CENTRALIZED CONTROLLER FOR AUDIO VISUAL BROADCASTS

(71) Applicant: Arista Networks, Inc., Santa Clara, CA (US)

(72) Inventor: Vijay Kumar Kulkarni, Bangalore (IN)

(73) Assignee: Arista Networks, Inc., Santa Clara, CA (US)

(*) Notice: Subject to any disclaimer, the term of this patent is extended or adjusted under 35 U.S.C. 154(b) by 111 days.

(21) Appl. No.: 15/399,961

(22) Filed: Jan. 6, 2017

(65) Prior Publication Data

US 2018/0198728 A1 Jul. 12, 2018

(51) Int. Cl.
- *H04L 12/911* (2013.01)
- *H04L 12/24* (2006.01)
- *H04L 12/703* (2013.01)
- *H04L 12/707* (2013.01)

(52) U.S. Cl.
CPC .......... *H04L 47/72* (2013.01); *H04L 41/0668* (2013.01); *H04L 41/0816* (2013.01); *H04L 41/0896* (2013.01); *H04L 45/22* (2013.01); *H04L 45/28* (2013.01); *H04L 41/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,908,701 | B2* | 12/2014 | Klein | H04L 45/16 370/351 |
| 2008/0232243 | A1* | 9/2008 | Oren | H04N 21/631 370/216 |
| 2012/0314597 | A1* | 12/2012 | Singh | H04L 43/0882 370/252 |
| 2014/0022938 | A1* | 1/2014 | Olsen | H04L 29/06333 370/254 |
| 2015/0131431 | A1* | 5/2015 | Gale | H04L 12/437 370/225 |
| 2016/0142303 | A1* | 5/2016 | Kim | H04L 65/4084 370/401 |

* cited by examiner

*Primary Examiner* — Yee F Lam
(74) *Attorney, Agent, or Firm* — Chamberlain, Hrdlicka, White, Williams & Aughtry

(57) ABSTRACT

In general, embodiments of the invention relate to a domain controller for a network. The domain controller includes functionality to manage the provisioning of paths in the network in order to enable content to be streamed across the network.

16 Claims, 7 Drawing Sheets

METHOD AND SYSTEM FOR CENTRALIZED CONTROLLER FOR AUDIO VISUAL BROADCASTS

BACKGROUND

Audio Video Bridging (AVB) has significantly improved the way audio/video (AV) broadcasts are distributed and shared. With the current AVB standards, AV connections are no longer required to be single-purpose or point-to-point connections, which has greatly expanded its capabilities for networking AV broadcasts. Additionally, the current IEEE standards allow for greater interoperability between AV systems, resulting in improved reliability and synchronization, as well as decreased latency.

However, even with the improvements described above, AV broadcasts are not as resource-efficient and reliable as they could be. This is especially true in static AV broadcast environments, where the topology of the network and host elements are pre-defined and relatively unchanged.

SUMMARY

In general, in one aspect, the invention relates to a domain controller. The domain controller includes a processor and memory comprising instructions, which when executed by the processor, perform a method. The method includes: receiving, from a first switch, a first encapsulated packet comprising a TalkerAdvertise message, wherein the TalkerAdvertise message originated from a talker, and wherein the TalkerAdvertise message is associated with a stream, encapsulating the TalkerAdvertise message in a second encapsulated packet, transmitting the second encapsulated packet to a second switch, wherein the second switch is operatively connected to a first listener, wherein the first switch and second switch are members in a domain, receiving, from the second switch, a third encapsulated packet comprising a first ListenerReady message, wherein the first ListenerReady message originated from the first listener, reserving bandwidth in a network topology along a first path between the talker and the first listener, after the reservation, encapsulating the first ListenerReady message in a fourth encapsulated packet, and transmitting the fourth encapsulated packet to the first switch.

Other aspects of the invention will be apparent from the following description and the appended claims.

DETAILED DESCRIPTION

Figure 1:
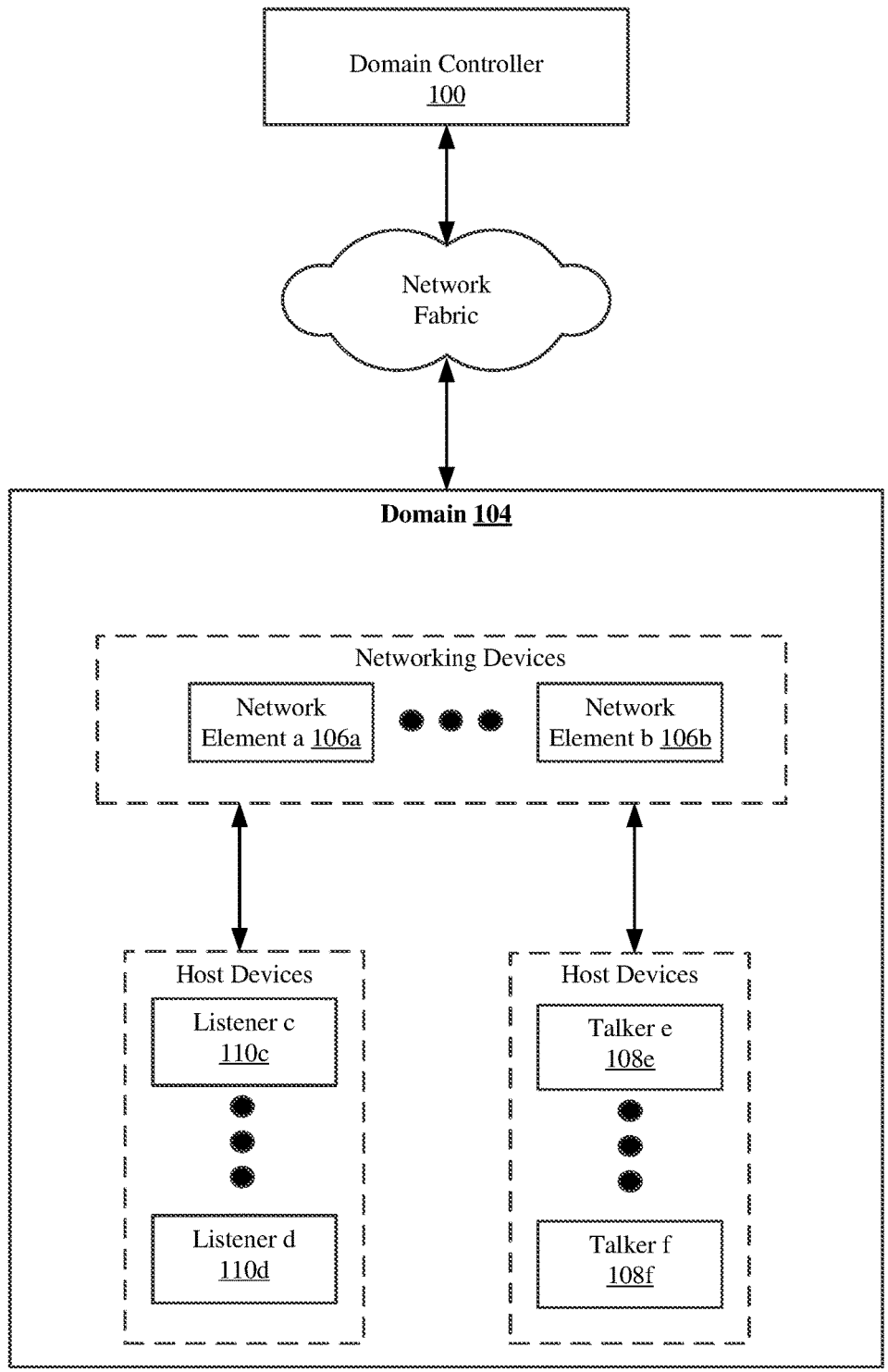
FIG. 1 shows a system in accordance with one or more embodiments of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for facilitating communication between network and host elements in an audiovisual broadcast (AVB) environment. More specifically, embodiments of the invention provide a method and system for deploying a more efficient and reliable AVB environment using a centralized domain controller. In one or more embodiments of the invention, the centralized domain controller enables users to pre-provision AVB streams before the AVB streams go live within their respective AVB domains.

In one or more embodiments of the invention, because the domain controller is able to communicate with the network elements (e.g., switches), the domain controller may serve as the central point of management and control of the AVB domains. As such, the network elements may act as intermediaries between the domain controller and host elements (e.g., the talkers and the listeners (described above)). Further, because embodiments of the invention utilize AVB streams that are pre-provisioned by the network elements using instructions provided by the centralized domain controller, the AVB streams may be broadcasted throughout the AVB domain without the need for constant polling of network and host elements and/or without requiring constant recalculation of AVB domain membership and packet traversal routes within a network topology.

FIG. 1 shows a schematic diagram of a system in accordance with one or more embodiments of the invention. As shown in FIG. 1, the system includes a domain controller (100) and a domain (104), connected using a network fabric. Each of the aforementioned components is described below.

In one or more embodiments of the invention, the domain controller (100) is any physical system (e.g., a desktop computer, a laptop, server, switch, or any other similar computing device) that includes a network interface (not shown) and a processor (not shown). The domain controller (100) may also include memory (not shown) and persistent storage (not shown). Additionally, in one or more embodiments of the invention, the domain controller (100) may also include functionality to act as an intermediary computing system. Such intermediary functionality includes responding to information requests from multiple networking devices (e.g. a network switch) and managing and facilitating AVB communications between the networking devices and multiple host devices.

Continuing with FIG. 1, the domain controller (100) is operatively connected to the domain (104) through a network fabric. In one or more embodiments of the invention, the domain (104) may be any group or collection of interconnected networking devices and host devices. The networking devices may include one or more switches (106) that are operatively connected to the host devices, which may include one or more listeners (108) and one or more talkers (110).

In one embodiment of the invention, a switch (106) is a physical device that includes persistent storage, memory (e.g., Random Access Memory), one or more processors, and two or more physical ports. Each port may be connected to either: (i) a computer system, or (ii) a network element. The computer system may include any type of physical system (including servers) that is configured to send and receive packets. The network element may correspond to any device that is part of the network infrastructure such as a switch, a multi-layer switch, or a router. Each network element is configured to receive packets via the ports and determine whether to (i) drop the packet, or (ii) send the packet out over another one of the ports on the network element. How the network element makes the determination of whether to drop or send the packet depends on whether the network element is a layer-2 (L2) switch or a layer-3 (L3) switch (also referred to as multilayer switch). If the network element is operating as a L2 switch, the network element uses the destination media access control (MAC) address in the received packet along with a forwarding table to determine out of which port to send the packet. If the network element is operating as a L3 switch, the network element uses the destination internet protocol (IP) address in the received packet along with a routing table to determine out of which port to send the packet.

In one or more embodiments of the invention, the network element (106) facilitates the connections between talkers and listeners in the domain (104) by processing and forwarding encapsulated packets (discussed below). Additionally, the network element (106) may facilitate communication amongst other network elements in the domain (104), as well as between the host devices and domain controller (100), using encapsulated packets. Further, as mentioned above, the network element (106) is operatively connected, either directly or indirectly, to a talker (108).

In one or more embodiments of the invention, a talker (108) may be any physical system or node that includes functionality to generate or produce an AV stream. For example, the talker (108) may be a laptop or desktop computing system, a DVD player, Blue ray device or similar media player, an internal or external microphone system, or any other device capable of producing an AV stream. Further, the talker (108) may act as a source host for the AVB stream, which may be replayed by a listener (110) in the domain (104). In one or more embodiments of the invention, a listener (110) may be any physical system or node that includes the functionality to replay the output of an AVB stream produced or initiated by a talker (110), thereby acting as an destination host for an AVB stream. For example, the listener (110) may be a speaker or system of speakers, a display monitor, or similar output device. For purposes of this description, the listeners and talkers may be collectively referred to as host elements.

While FIG. 1 shows a configuration of components, other configurations may be used without departing from the scope of the invention. For example, various components may be combined to create a single component. As another example, the functionality performed by a single component may be performed by two or more components.

Figure 2:
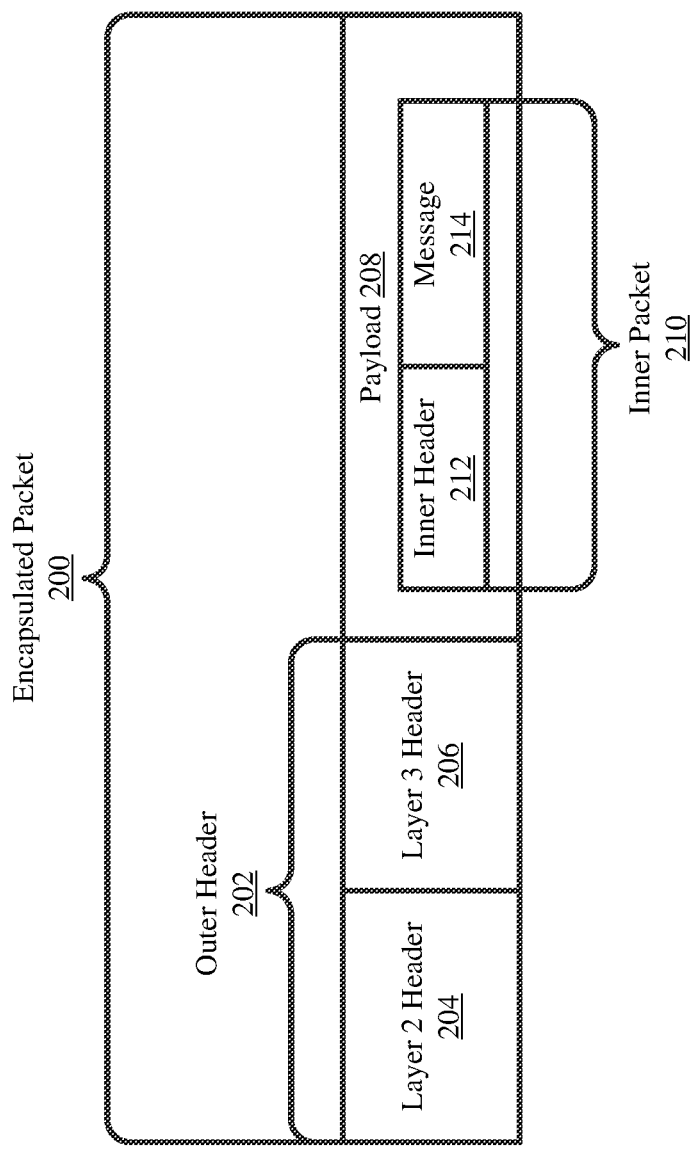
FIG. 2 shows a depiction of an Internet Protocol (IP) packet structure, in accordance with one or more embodiments of the invention.

FIG. 2 shows a depiction of a packet structure, in accordance with one or more embodiments of the invention. More specifically. FIG. 2 shows an encapsulated packet (200), which may be sent or received by the domain controller (100) or the network element (106). In one or more embodiments of the invention, the encapsulated packet (200) includes an outer header (202), which facilitates the transport of AVB data between the network element (106) and the domain controller (100) using a layer 2 header (204) and a layer 3 header (206). The layer 2 header (204) may include Ethernet header information, such as the source and destination MAC addresses for an encapsulated Ethernet packet. The layer 3 header may include IP header information, such as the source and destination IP addresses of the sending and receiving devices.

Continuing with FIG. 2, the encapsulated packet (200) also includes a payload (208) containing an inner packet (210). The inner packet (210) includes an inner header (212), as well as the message (214) that is to be communicated to the destination device. In one or more embodiments of the invention, the message (214) may be a TalkerAdvertise message initiated by a talker (108e, 108f) or it may be a ListenerReady message initiated by a listener (110c, 110d) in the domain (104) (See e.g., FIG. 3 for additional detail). The Encapsulated packet (200) may include other components without departing from the invention. In one embodiment of the invention, the TalkerAdvertise message corresponds to the TalkerAdvertise message defined in IEEE 802.1Qat and the ListenerReady message corresponds to the ListenerReady message defined in IEEE 802.1Qat.

Figure 3A:
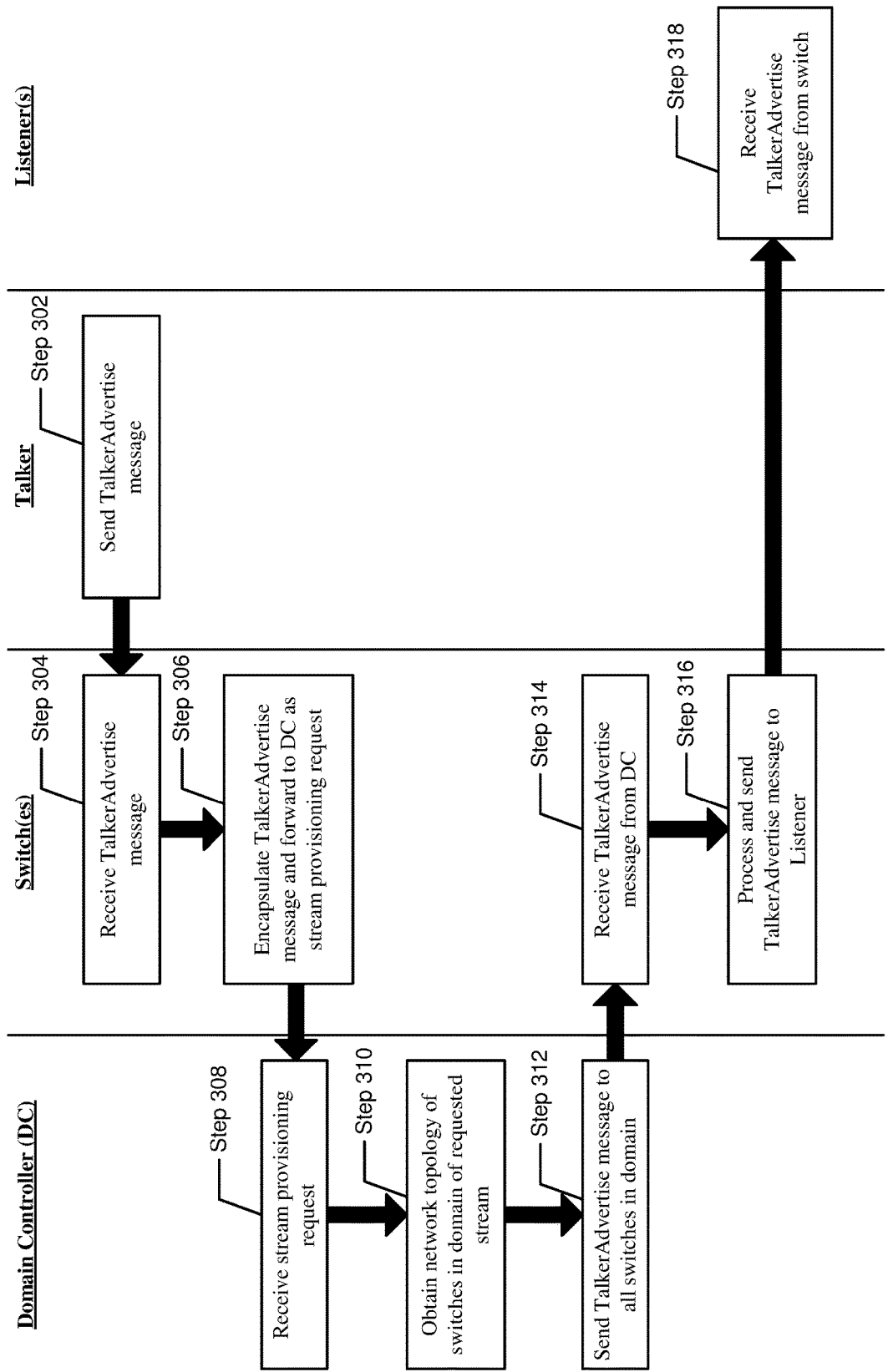
FIG. 3A-3B show flowcharts for provisioning and transmitting a stream, in accordance with one or more embodiments of the invention.
Figure 3B:
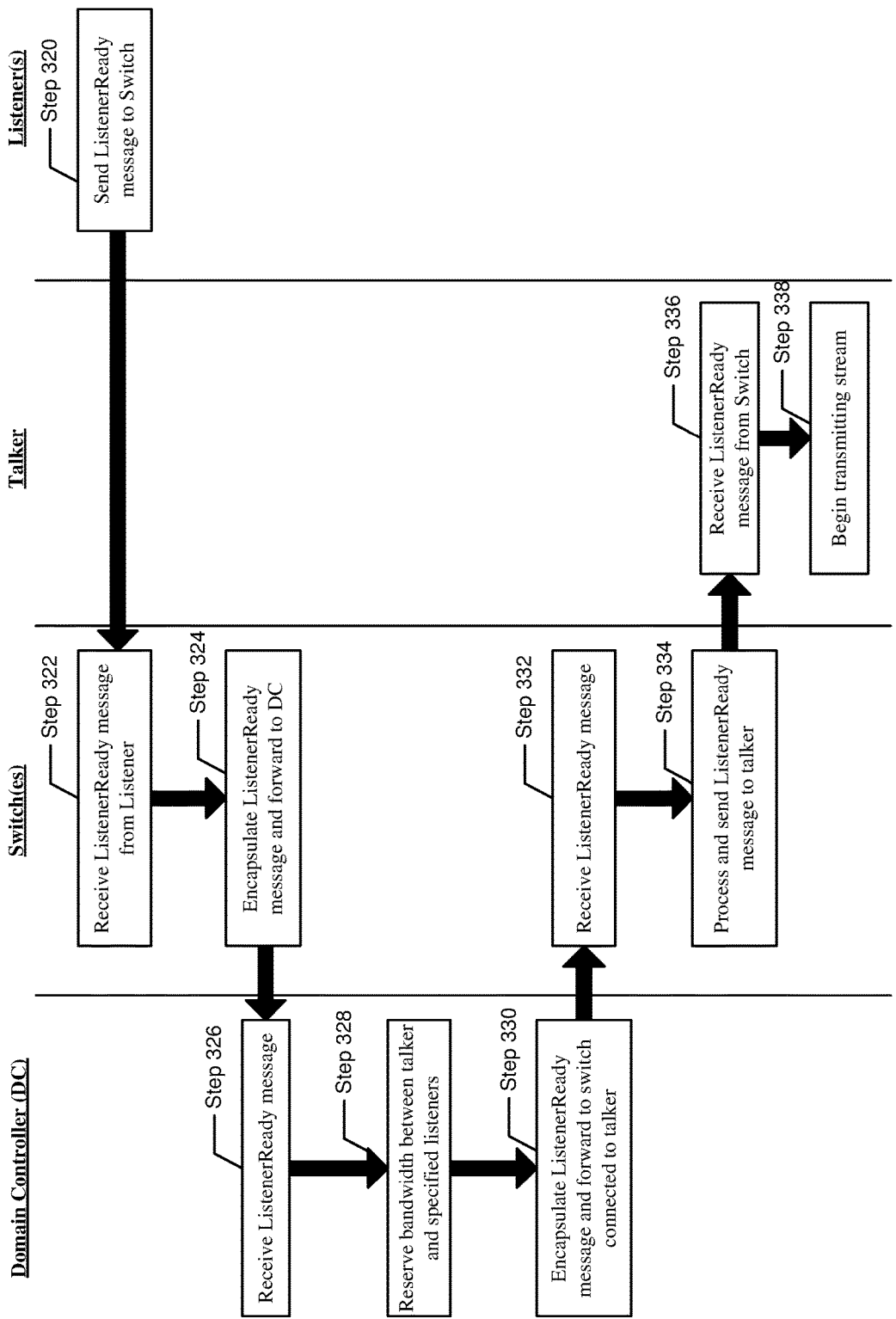

FIGS. 3A-3B show flowcharts, in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3A-3B may be performed in parallel with any other steps shown in FIGS. 3-6 without departing from the invention.

FIG. 3A shows the process for provisioning a stream in accordance with one or more embodiments of the invention. In step 302, a talker in an AVB domain sends a TalkerAdvertise message to a switch in the same AVB domain. This message, which may be sent to the switch as part of an Ethernet packet, initiates the process for registering an AVB stream generated by the talker and reserving the necessary resources to support the AVB stream's entire communication path to one or more listeners. The TalkerAdvertise message may include details pertaining to the AVB stream, such as a stream ID identifying the source of the stream (e.g., via MAC address), as well as Quality of Service (QoS) requirements defined by the talker. In another embodiment of the invention, the provisioning process may be initiated by the Domain Controller. In such scenarios, the Domain Controller include functionality to trigger the generation of the TalkerAdvertise message by the talked in the AVB domain.

In step 304, the switch receives the TalkerAdvertise message from the talker. Upon receipt of the message, and as described in step 306, the switch encapsulates the TalkerAdvertise message to generate an encapsulated packet (see e.g., FIG. 2). The encapsulated packet is then transmitted to the domain controller as a stream provisioning request.

In step 308, the domain controller receives the stream provisioning request. In step 310, the domain controller obtains a network topology of all of the pertinent switches in the domain of the requested stream. The network topology, which may include the network connectivity of all or a portion of the network and host elements in an AVB domain, may be obtained directly the domain controller or it may be obtained from another connected system or other external source.

In step 312, once the network topology is obtained, the domain controller transmits the TalkerAdvertise message to the all or some of switches in the domain's network topology (e.g., switches that are connected (directly or indirectly) to one or more host elements, which may be a listener). The transmission in step 312 may take the form of unicast, multicast, or broadcast encapsulated packets. In one embodiment of the invention, if the domain controller determines that the network does not have sufficient resources to support the streaming related to the TalkerAdvertise message, then the domain controller may generate and return a TalkerAdvertiseFailed message and transmit this message to the talker. In such cases, the remaining steps in FIGS. 3A and 3B are not performed.

Continuing with discussion of FIG. 3A, in step 314, one or more of the switches in the domain receive the TalkerAdvertise message from the domain controller. In step 316, the switch(es) process and send the TalkerAdvertise message to any listeners that are connected to the switch(es) to determine if the listener wishes to receive the AVB stream. In step 318, the listener(s) receive the TalkerAdvertise message from the switch(es).

FIG. 3B shows the process for transmitting a stream to a listener, in accordance with one or more embodiments of the invention. In one embodiment of the invention, the steps shown in FIG. 3B may be performed for multiple listeners in parallel.

Turning to FIG. 3B, after receiving the TalkerAdvertise message, as described in step 318, in step 320 the listener, if the listener wants to receive the AVB stream from the talker, sends a ListenerReady message to the switch, indicating that the listener is ready to receive the AVB stream from the talker. In step 322, the switch receives the ListenerReady message from the listener. In step 324, the switch encapsulates the ListenerReady message to generate an encapsulated packet (see e.g., FIG. 2) and forwards it to the domain controller.

In step 326, the domain controller receives the encapsulated packet and then extracts the ListenerReady message. In step 328, the domain controller, in response to receiving the listener ready message, reserves bandwidth in the network fabric along a path between the talker and listener before the talker commences transmission of the AVB stream. In one embodiment of the invention, performing the above steps prior to transmission of the AVB stream, the domain controller is able to ensure that there are sufficient resources along the entire path (between the listener and talker) in order to avoid any foreseeable service disruptions or network latency issues.

In step 330, the domain controller encapsulates the ListenerReady message in an encapsulated message and forwards it to the switch that is connected to the talker. In step 332, the switch receives the encapsulated packet and extracts the ListenerReady message. In step 334, the switch then sends the extracted ListenerReady message to the talker. In step 336, the talker receives the ListenerReady message from the switch. In step 338, the talker begins transmitting the stream in response to the ListenerReady message.

Figure 4:
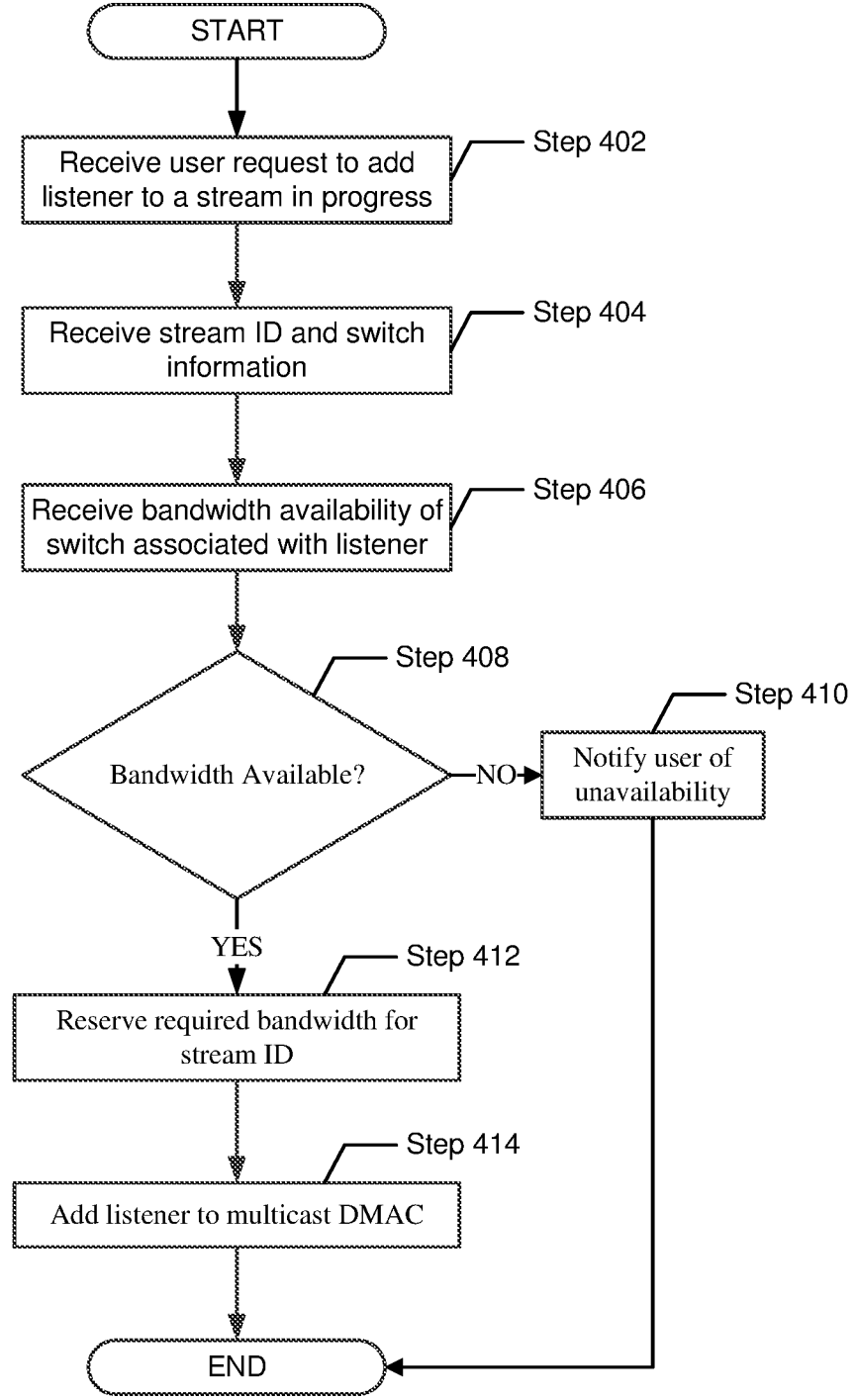
FIG. 4 shows a flowchart for adding a listener to an existing stream, in accordance with one or more embodiments of the invention.

FIG. 4 shows a flowchart for adding a listener to an existing AVB stream in progress, in accordance with one or more embodiments of the invention. All steps in FIG. 4 are described from the perspective of the domain controller.

In step 402, a user request to add a listener to a stream currently in progress, is received. The user request may be received, for example, via direct input into a user interface of the domain controller, via a third party application programming interface (API), etc. In step 404, the stream ID and switch information for the stream that a listener wishes to join is received. In step 406, information pertaining to the bandwidth availability of a switch associated with the listener is received. In step 408, a determination is made as to whether there is bandwidth available in the network fabric to support the addition of the listener to the existing AVB stream. If there is not sufficient bandwidth to add the listener, the process moves to step 410, where the user is notified that there is not enough bandwidth and therefore the listener cannot be added to the requested AVB stream. However, if in step 408 it is determined that there is sufficient bandwidth, then the process moves to step 412, where the required amount of bandwidth to join the requested AVB stream is reserved. In step 414, after reserving the necessary bandwidth, the listener is added to the AVB stream by associating listener with multicast domain media access control (DMAC) address for that particular stream ID. The association of the listener with the multicast DMAC address may include updating this information in one or more switches within the domain.

Figure 5:
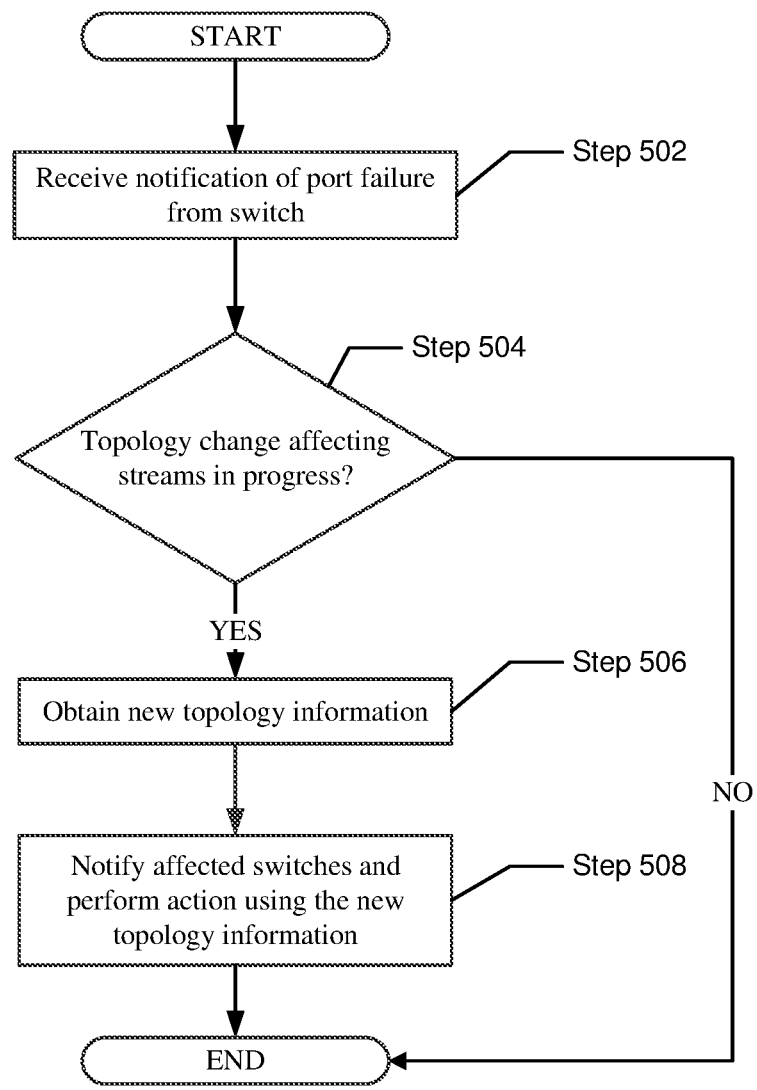
FIG. 5 shows a flowchart for re-provisioning in the event of a switch port failure, in accordance with one or more embodiments of the invention.

FIG. 5 shows a flowchart for re-provisioning an AVB stream in the event of a switch port (or switch) failure during an active AVB stream in progress, in accordance with one or more embodiments of the invention. All steps in FIG. 5 are described from the perspective of the domain controller.

In step 502, a notification of a switch port failure is received from a switch in the AVB domain. In step 504, a determination is made as to whether the switch port failure will adversely affect the current topology associated with the AVB stream in progress. In one embodiment of the invention, to make the determination in step 504, the network topology discussed above in the FIG. 3 is reassessed to determine whether the network path(s) between the switch experiencing the port failure and one or more listeners will be disrupted in some way. For example, the port failure may result in a complete disruption of service between the affected switch and a connected talker or listener. As another example, rather than resulting in a complete disruption of service, the port failure may result in a significantly degraded quality of service for the AVB stream on the talker or listener's end. In any case where it is determined that the switch port failure adversely affects the network topology, then process moves to step 506, where new topology information is obtained, where possible. Otherwise, if the switch port failure does not adversely affect network path(s) between the switch experiencing the port failure and one or more listeners, then the process ends and the AVB stream continues as usual.

In step 508, assuming that the port failure resulted in an adverse effect, and upon obtaining the new topology information, the affected switches are notified and provided with the new topology information. In such scenarios, the Domain Controller directs the configuration of the switches in the new/alternative path in order to enable the content to be streamed from the talker to the particular listener. However, if an alternate path does not exist or new topology information cannot be obtained by the domain controller, then a message is sent to the affected switches notifying them as such. Further, the domain controller may also record (or otherwise track) that there is no path between the talker and the particular listener. This information may be used to processing further requests to provisions streams (See e.g., FIGS. 3A-3B).

While FIGS. 3A-5 describe various embodiments of the invention which may implemented using switches, the invention may be implemented on any network element without departing from the invention.

The following example is for explanatory purposes only and not intended to limit the scope of the invention.

Figure 6:
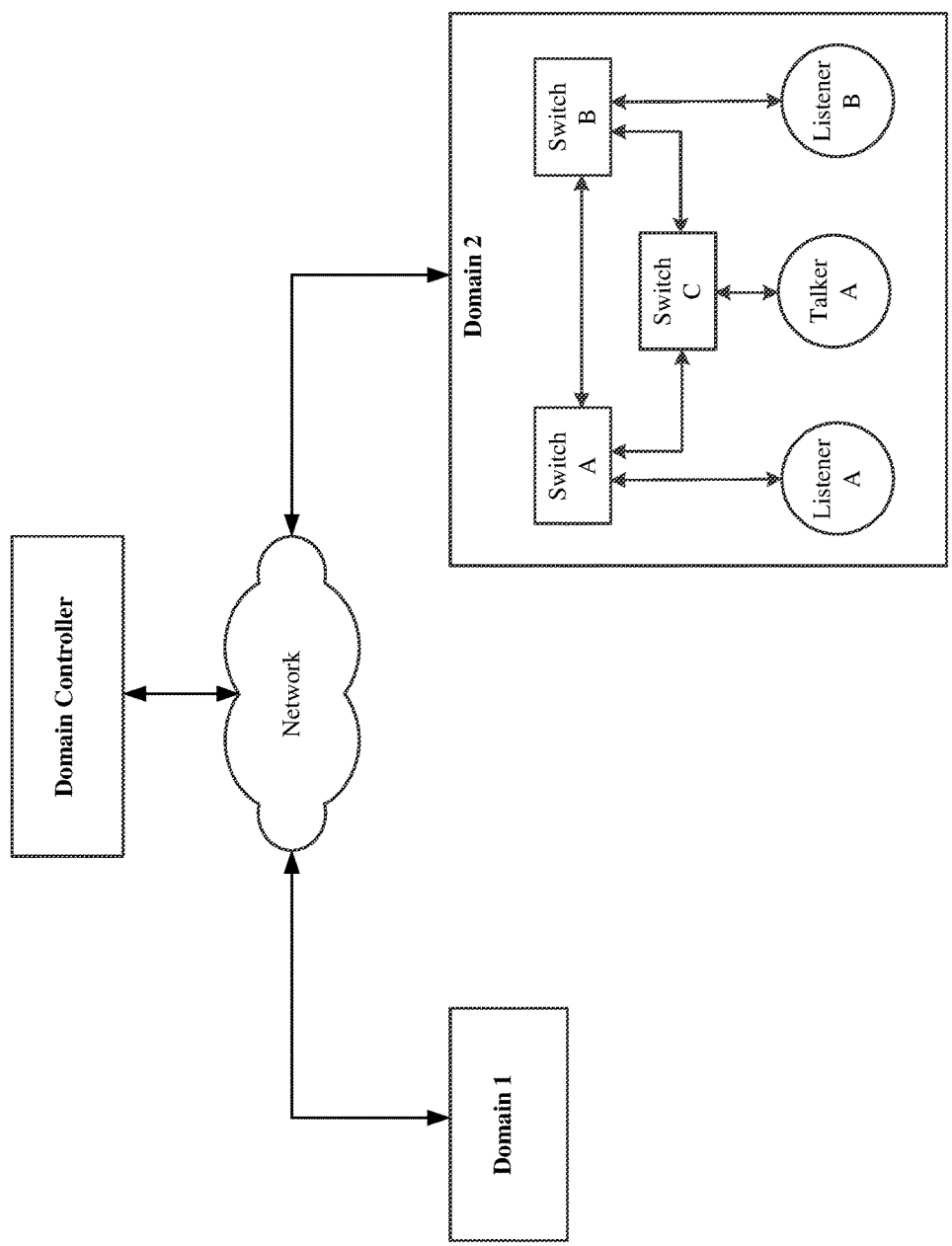
FIG. 6 shows an example system implementation, in accordance with one or more embodiments of the invention.

FIG. 6 shows an example system implementation, in accordance with one or more embodiments of the invention. Consider a scenario where there exists an AVB broadcast domain that includes three switches (Switch A, Switch B and Switch C), two listeners (Listener A and Listener B) and Talker A, which is a laptop. Listener A is directly connected to Switch A, listener B is directly connected to Switch B, and Talker A is directly connected to Switch C. Further, Switches A, B and C are connected to each other using another networking device, such as a router.

Continuing with the above scenario, Talker A, which functions as a music production system, generates an audio broadcast stream of the music produced by a recording artist. In order to initiate that stream for playback to Listeners A and B, which are geographically located in different rooms of the same building, Talker A sends a TalkerAdvertise message to Switch C. Once Switch C receives the TalkerAdvertise, it encapsulates it to generate an encapsulated packet and transmits it to a server—the domain controller—through network fabric. The domain controller receives the encapsulated packet, extracts the TalkerAdvertise message, obtains network topology information for the AVB domain, re-encapsulates the TalkerAdvertise message to generate one or more encapsulated packets and then transmits the encapsulated packets to the listeners in the AVB domain.

Upon receiving the encapsulated packet, Switch A extracts the TalkerAdvertise message and transmits it to Listener A. Switch B performs similar steps in order to obtain the TalkerAdvertise message and forward it to Listener B. Both Listener A and Listener B want to receive the audio broadcast stream from Talker A, so they each generate and send a ListenerReady message to the their respective switches. More specifically, Listener A sends a ListenerReady message to Switch A, which in turn encapsulates the ListenerReady message and transmits it to the domain controller. Additionally, Listener B sends a ListenerReady message to Switch B, which also encapsulates the ListenerReady message and transmits it to the domain controller.

Upon receiving the encapsulated packets from Switch A and Switch B, the domain controller extracts and processes the ListenerReady messages. As a result of the processing, the domain controller reserves the necessary bandwidth along the network paths between Talker A and Listener A and between Talker A and Listener B, before Talker A begins transmission of the AVB stream to the Listeners. The domain controller then forwards the original ListenerReady messages (each encapsulated in its own encapsulated packet) to Switch C. Switch C subsequently extracts the ListenerReady messages from each of the encapsulated packets and transmits them to Talker A. Shortly after receiving the ListenerReady messages, Talker A begins transmitting the audio broadcast stream.

Embodiments of the invention may be implemented on a computing system where any combination of mobile, desktop, server, embedded, or other types of hardware may be used. The computing system may be connected to a network (e.g., a local area network (LAN), a wide area network (WAN) such as the Internet, mobile network, or any other type of network) via a network interface connection (not shown). The input and output device(s) may be locally or remotely connected to the computing system.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer-readable medium comprising instructions, which when executed by a processor, perform a method, the method comprising:
   receiving, at a domain controller and from a first switch, a first encapsulated packet comprising a TalkerAdvertise message, wherein the TalkerAdvertise message originated from a talker, and wherein the TalkerAdvertise message is associated with a stream;
   encapsulating, by the domain controller, the TalkerAdvertise message in a second encapsulated packet;
   transmitting, by the domain controller, the second encapsulated packet to a second switch, wherein the second switch is operatively connected to a first listener, wherein the first switch and second switch are members in a domain;
   receiving, by the domain controller and from the second switch, a third encapsulated packet comprising a first ListenerReady message, wherein the first ListenerReady message originated from the first listener;
   reserving, by the domain controller, bandwidth in a network topology along a first path between the talker and the first listener;
   after reserving the bandwidth, encapsulating, by the domain controller, the first ListenerReady message in a fourth encapsulated packet;
   transmitting, by the domain controller, the fourth encapsulated packet to the first switch;
   receiving, by the domain controller and from the second switch, a notification of a port failure;
   determining, by the domain controller, that the port failure impacts the first path in the network topology between the talker and the first listener;
   determining, by the domain controller, a second path in the network topology between the talker and the first listener; and
   reserving second bandwidth in along the second path.

2. The non-transitory computer-readable medium of claim 1, wherein the method further comprises:
   encapsulating, by the domain controller, the TalkerAdvertise message in a fifth encapsulated packet;
   transmitting the fifth encapsulated packet to a third switch, wherein the third switch is operatively connected a second listener, wherein the third switch is a member in the domain;
   receiving, from the third switch, a sixth encapsulated packet comprising a second ListenerReady message, wherein the second ListenerReady message originated from the second listener;

determining a third path in the network topology between the talker and the second listener;

determining that there is insufficient bandwidth along the third path; and in response to determining that there is insufficient bandwidth along the third path, sending a notification to the third switch.

3. The non-transitory computer-readable medium of claim 1, wherein the method further comprises:

receiving a request to add a second listener to the stream, wherein the request comprises: stream information comprising a stream identifier (ID), wherein the stream ID is associated with the stream, switch information comprising a switch ID, wherein the switch ID is associated with a third switch, wherein the third switch is operatively connected to a second listener;

reserving third bandwidth in the network topology along a third path between the talker and the second listener;

after reserving the third bandwidth, encapsulating a second ListenerReady message in a seventh encapsulated packet; and transmitting the seventh encapsulated packet to the first switch.

4. The non-transitory computer-readable medium of claim 1, wherein the method further comprises:

receiving, from the second switch, a second notification of a second port failure; and determining that the second port failure does not impact the first path in the network topology between the talker and the first listener.

5. The non-transitory computer-readable medium of claim 1, wherein the first Listener Ready message is stored in a payload of the fourth encapsulated packet.

6. The non-transitory computer-readable medium of claim 1, wherein the TalkerAdvertise message is stored in a payload of a fifth encapsulated packet.

7. The non-transitory computer-readable medium of claim 1, wherein the talker is a physical system that broadcasts the stream.

8. The non-transitory computer-readable medium of claim 1, wherein the first listener is physical system that receives the stream.

9. A method, comprising:

receiving, at a domain controller and from a first switch, a first encapsulated packet comprising a TalkerAdvertise message, wherein the TalkerAdvertise message originated from a talker, and wherein the TalkerAdvertise message is associated with a stream;

encapsulating, by the domain controller, the TalkerAdvertise message in a second encapsulated packet;

transmitting, by the domain controller, the second encapsulated packet to a second switch, wherein the second switch is operatively connected to a first listener, wherein the first switch and second switch are members in a domain;

receiving, by the domain controller and from the second switch, a third encapsulated packet comprising a first ListenerReady message, wherein the first Listener-Ready message originated from the first listener;

reserving, by the domain controller, bandwidth in a network topology along a first path between the talker and the first listener;

after the reservation, encapsulating, by the domain controller, the first ListenerReady message in a fourth encapsulated packet; and transmitting, by the domain controller, the fourth encapsulated packet to the first switch;

receiving, by the domain controller and from the second switch, a notification of a port failure;

determining, by the domain controller, that the port failure impacts the first path in the network topology between the talker and the first listener;

determining, by the domain controller, a second path in the network topology between the talker and the first listener; and reserving second bandwidth in along the second path.

10. The method of claim 9, further comprising:

encapsulating the TalkerAdvertise message in a fifth encapsulated packet;

transmitting the fifth encapsulated packet to a third switch, wherein the third switch is operatively connected a second listener, wherein the third switch is a member in the domain;

receiving, from the third switch, a sixth encapsulated packet comprising a second ListenerReady message, wherein the second ListenerReady message originated from the second listener;

determining a third path in the network topology between the talker and the second listener;

determining that there is insufficient bandwidth along the third path; and in response to determining that there is insufficient bandwidth along the second path, sending a notification to the third switch.

11. The method of claim 9, further comprising:

receiving a request to add a second listener to the stream, wherein the request comprises: stream information comprising a stream identifier (ID), wherein the stream ID is associated with the stream, switch information comprising a switch ID, wherein the switch ID is associated with a third switch, wherein the third switch is operatively connected to a second listener;

reserving third bandwidth in the network topology along a third path between the talker and the second listener;

after reserving the third bandwidth, encapsulating a second ListenerReady message in a seventh encapsulated packet; and transmitting the seventh encapsulated packet to the first switch.

12. The method of claim 9 further comprising:

receiving, from the second switch, a second notification of a second port failure; and determining that the second port failure does not impact the first path in the network topology between the talker and the first listener.

13. The method of claim 9, wherein the first Listener-Ready message is stored in a payload of the fourth encapsulated packet.

14. The method of claim 9, wherein the TalkerAdvertise message is stored in a payload of a fifth encapsulated packet.

15. The method of claim 9, wherein the talker is a physical system that broadcasts the stream.

16. The method of claim 9, wherein the first listener is physical system that receives the stream.

* * * * *